US011057109B2

(12) United States Patent
Stapleton et al.

(10) Patent No.: US 11,057,109 B2
(45) Date of Patent: *Jul. 6, 2021

(54) SYSTEM AND METHOD FOR PERFORMANCE OPTIMIZATION IN AND THROUGH A DISTRIBUTED ANTENNA SYSTEM

(71) Applicant: Dali Systems Co. Ltd., Grand Cayman (KY)

(72) Inventors: Shawn Patrick Stapleton, Burnaby (CA); Sasa Trajkovic, Burnaby (CA); Wolfgang Weber, Burnaby (CA)

(73) Assignee: DALI SYSTEMS CO. LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,980

(22) Filed: Mar. 21, 2019

(65) Prior Publication Data
US 2020/0059299 A1 Feb. 20, 2020

Related U.S. Application Data

(62) Division of application No. 14/621,192, filed on Feb. 12, 2015, now Pat. No. 10,284,296.
(Continued)

(51) Int. Cl.
*H04B 10/2575* (2013.01)
*H04W 52/24* (2009.01)
(Continued)

(52) U.S. Cl.
CPC ..... *H04B 10/25753* (2013.01); *H04B 10/564* (2013.01); *H04W 52/245* (2013.01);
(Continued)

(58) Field of Classification Search
CPC ........... H04B 10/25753; H04B 10/564; H04W 4/029; H04W 52/0206; H04W 52/245; H04W 52/285; Y02D 30/70
(Continued)

(56) References Cited

U.S. PATENT DOCUMENTS 8,259,569 B2 9/2012 Banerjee et al.
8,259,659 B2 9/2012 Luft et al.
(Continued)

FOREIGN PATENT DOCUMENTS

CN 101083496 A 12/2007
CN 102907012 A 1/2013
(Continued)

OTHER PUBLICATIONS

Chen et al; Planning Optimization of the Distributed Antenna System in high speed railway communication network based on improved Cuckoo search; International Journal of Antennas and Propagation; May 2018; pp. 1-14. (Year: 2018).*
(Continued)

*Primary Examiner* — Amritbir K Sandhu
(74) *Attorney, Agent, or Firm* — Artegis Law Group, LLP

(57) ABSTRACT

A method for operating a Distributed Antenna System (DAS) includes providing a plurality of Digital Remote Units (DRUs), each configured to send and receive wireless radio signals and providing a plurality of inter-connected Digital Access Units (DAUs), each configured to communicate with at least one of the plurality of DRUs via optical signals and each being coupled to at least one sector of a base station. The method also includes providing a plurality of sensors operable to detect activity at each of the plurality of DRUs, turning off a DRU downlink signal at one of the plurality of DRUs in response to an output from one of the plurality of sensors, and turning on a DRU downlink signal
(Continued)

at another of the plurality of DRUs in response to an output from another of the plurality of sensors.

20 Claims, 9 Drawing Sheets

Related U.S. Application Data

(60) Provisional application No. 61/939,650, filed on Feb. 13, 2014.

(51) Int. Cl.
| | |
|---|---|
| *H04W 52/28* | (2009.01) |
| *H04B 10/564* | (2013.01) |
| *H04W 52/02* | (2009.01) |
| *H04W 4/029* | (2018.01) |

(52) U.S. Cl.
CPC ......... *H04W 52/285* (2013.01); *H04W 4/029* (2018.02); *H04W 52/0206* (2013.01); *Y02D 30/70* (2020.08)

(58) Field of Classification Search
USPC .................................................. 398/115–117
See application file for complete search history.

(56) References Cited

U.S. PATENT DOCUMENTS

| | | | |
|---|---|---|---|
| 8,346,160 B2 | 1/2013 | Kummetz | |
| 8,682,338 B2 | 3/2014 | Lemson et al. | |
| 8,902,076 B2 | 12/2014 | Pederson et al. | |
| 8,958,410 B2* | 2/2015 | Fischer | H04W 88/085 |
| | | | 370/345 |
| 9,113,347 B2 | 8/2015 | Henry et al. | |
| 10,284,296 B2* | 5/2019 | Stapleton | H04B 10/564 |
| 10,506,454 B2* | 12/2019 | Stapleton | H04W 16/04 |
| 10,644,798 B2* | 5/2020 | Trajkovic | H04B 10/25753 |
| 2009/0107770 A1 | 4/2009 | Mischler | F01M 1/24 |
| | | | 184/6.4 |
| 2009/0207770 A1* | 8/2009 | Fayfield | H04Q 9/00 |
| | | | 370/311 |
| 2009/0316608 A1 | 12/2009 | Singh et al. | |
| 2010/0265848 A1 | 10/2010 | Kummetz et al. | |
| 2010/0278530 A1 | 11/2010 | Kummetz et al. | |
| 2010/0279704 A1 | 11/2010 | Vachhani | |
| 2011/0230197 A1 | 9/2011 | Wu et al. | |
| 2011/0241425 A1 | 10/2011 | Hunter, Jr. et al. | |
| 2011/0281579 A1 | 11/2011 | Kummetz | |
| 2012/0039254 A1* | 2/2012 | Stapleton | H04W 88/085 |
| | | | 370/328 |
| 2012/0039320 A1* | 2/2012 | Lemson | H04W 24/02 |
| | | | 370/338 |
| 2012/0309293 A1 | 12/2012 | Kummetz et al. | |
| 2013/0017863 A1* | 1/2013 | Kummetz | H04W 16/26 |
| | | | 455/562.1 |
| 2013/0114486 A1 | 5/2013 | Spedaliere et al. | |
| 2013/0114963 A1* | 5/2013 | Stapleton | H04W 24/02 |
| | | | 398/115 |
| 2013/0128810 A1 | 5/2013 | Lee et al. | |
| 2013/0157664 A1 | 6/2013 | Chow et al. | |
| 2014/0031049 A1 | 1/2014 | Sundaresan et al. | |
| 2014/0037292 A1* | 2/2014 | Stapleton | H04B 10/25753 |
| | | | 398/68 |
| 2014/0051348 A1* | 2/2014 | Chow | H04W 16/26 |
| | | | 455/7 |
| 2014/0057627 A1* | 2/2014 | Hejazi | H04W 36/30 |
| | | | 455/424 |
| 2014/0162664 A1 | 6/2014 | Stapleton et al. | |
| 2014/0162713 A1* | 6/2014 | Stapleton | H04W 88/085 |
| | | | 455/509 |
| 2014/0169263 A1 | 6/2014 | Stapleton | |
| 2014/0233442 A1* | 8/2014 | Atias | H04W 52/0251 |
| | | | 370/311 |
| 2014/0314061 A1* | 10/2014 | Trajkovic | H04B 10/25754 |
| | | | 370/338 |
| 2015/0098350 A1 | 4/2015 | Mini et al. | |
| 2015/0141013 A1 | 5/2015 | Cui et al. | |
| 2015/0141027 A1 | 5/2015 | Tsui et al. | |
| 2015/0244840 A1* | 8/2015 | Chakrabarti | H04L 69/08 |
| | | | 370/328 |
| 2015/0256358 A1* | 9/2015 | Stapleton | H04W 52/245 |
| | | | 370/329 |
| 2015/0282069 A1* | 10/2015 | Hobbs | H04W 24/02 |
| | | | 370/252 |
| 2015/0304044 A1* | 10/2015 | Stapleton | H04W 52/285 |
| | | | 398/115 |
| 2016/0112927 A1 | 4/2016 | Cui et al. | |
| 2017/0171720 A1 | 6/2017 | Holleczek et al. | |
| 2017/0214420 A1 | 7/2017 | Phillips et al. | |
| 2017/0238318 A1 | 8/2017 | Lemson et al. | |
| 2019/0207770 A1 | 7/2019 | Zhou et al. | |

FOREIGN PATENT DOCUMENTS

| | | |
|---|---|---|
| CN | 103069920 A | 4/2013 |
| CN | 103201958 A | 7/2013 |
| JP | 2013-538527 A | 10/2013 |
| JP | 2015-527843 A | 9/2015 |
| WO | WO 2012/024349 | 2/2012 |
| WO | WO 2012/030875 | 3/2012 |
| WO | 2012138769 A1 | 10/2012 |
| WO | 2013070613 A1 | 5/2013 |
| WO | 2014022211 A2 | 2/2014 |
| WO | WO 2014/022211 | 2/2014 |

OTHER PUBLICATIONS

Chen et al; Planning Optimization of the Distributed Antenna System in High-Speed Railway Communication Network Based on Improved Cuckoo Search; 2018; International Journal of Antennas and Propagation; pp. 1-15 (Year: 2018).*
Chinese Patent Application No. 201580008198.0, "Office Action", dated Apr. 28, 2018, 9 pages.
English Translation of Notification for Going through Patent Registration Formalities, Notification of Grant of Patent for Invention and Search Report in CN 201580008198.0.
European Patent Application No. EP15749690.2, "Extended European Search Report", dated Sep. 11, 2017, 10 pages.
International Search Report, dated May 19, 2015 for International Patent Application No. PCT/US2015/15790, 2 pages.
PCT/US2015/015790, "International Preliminary Report on Patentability", dated Aug. 25, 2016, 8 pages.
Written Opinion, dated May 19, 2015 for International Patent Application No. PCT/US2015/15790, 6 pages.
Examination Report for Australian Application No. 2015218375, dated Nov. 6, 2018.
Notice of Acceptance for Australian Application No. 2015218375, dated Nov. 11, 2019.
Examination Report for Australian Application No. 2020201064, dated Oct. 1, 2020.
Notice of Acceptance for Australian Application No. 2020201064, dated Oct. 9, 2020.
Intention to Grant for European Application No. 15749690.2, dated Jun. 8, 2018.
Notice of Reasons for Rejection (Including Translation) for Japanese Patent Application No. 2016-551758, dated Dec. 21, 2018.
Decision to Grant (Including Translation) for Japanese Patent Application No. 2016-551758, dated Sep. 3, 2019.
Office Action (Restriction Requirement) for U.S. Appl. No. 14/621,192, dated May 9, 2016.
Office Action for U.S. Appl. No. 14/621,192, dated Sep. 20, 2016.
Office Action for U.S. Appl. No. 14/621,192, dated May 30. 2017.
Office Action for U.S. Appl. No. 14/621,192, dated Dec. 15, 2017.
Office Action for U.S. Appl. No. 14/621,192, dated Jul. 3, 2018.

(56) References Cited

OTHER PUBLICATIONS

Notice of Allowance for U.S. Appl. No. 14/621,192, dated Dec. 21, 2018.

* cited by examiner

SYSTEM AND METHOD FOR PERFORMANCE OPTIMIZATION IN AND THROUGH A DISTRIBUTED ANTENNA SYSTEM

CROSS-REFERENCES TO RELATED APPLICATIONS

This application is a divisional of U.S. patent application Ser. No. 14/621,192, filed Feb. 12, 2015, which claims priority to U.S. Provisional Patent Application No. 61/939,650, filed on Feb. 13, 2014, entitled "System and Method for Performance Optimization In and Through a Distributed Antenna System," the disclosures of which are hereby incorporated by reference in their entirety for all purposes.

SUMMARY OF THE INVENTION

Embodiments of the present invention relate to communication networks. More particularly, embodiment of the present invention provide methods and systems related to the provision and operation of distributed antenna systems (DAS). Merely by way of example, the present invention has been applied to distributed antenna systems. Another example of the present invention could include a system of distributed and configurable radios connected via a router to donors feeding a Base Station. The methods and systems described herein are applicable to a variety of communications systems including systems utilizing various communications standards.

According to an embodiment of the present invention, a method for operating a Distributed Antenna System (DAS) is provided. The method includes providing a set of Digital Remote Units (DRUs) operable to send and receive wireless radio signals. Each of the set of DRUs is associated with a geographic area. The method also includes providing a Digital Access Unit (DAU) operable to communicate with the set of DRUs via an optical signal. The DAU is coupled to at least sector of a base transceiver station (BTS). The method further includes receiving uplink signals at one or more of the set of DRUs and monitoring train activity in the geographic areas associated with the set of DRUs. The method includes increasing a gain coefficient associated with one of the set of DRUs in response to determining an increase in monitored train activity in the geographic area associated with the one of the set of DRUs, decreasing a gain coefficient associated with another of the set of DRUs in response to determining a decrease in monitored train activity in the geographic area associated with the another of the set of DRUs, and transmitting, to the DAU, scaled uplink signals associated with the one of the set of DRUs and the another of the set of DRUs.

According to another embodiment of the present invention, a system for operating a Distributed Antenna System (DAS) is provided. The system includes a plurality of Digital Remote Units (DRUs), each configured to receive wireless radio uplink signals and transmit wireless radio downlink signals and a plurality of inter-connected Digital Access Units (DAUs), each configured to communicate with at least one of the plurality of DRUs via optical signals and each being coupled to at least one sector of a base station. The system also includes a plurality of detectors, each configured to measure uplink power at one of the plurality of DRUs and a processor coupled to the plurality of detectors and configured to vary gain coefficients for each of the wireless radio uplink signals in response to the measured uplink power.

According to a specific embodiment of the present invention, a method for operating a Distributed Antenna System (DAS) is provided. The method includes providing a plurality of Digital Remote Units (DRUs), each configured to send and receive wireless radio signals and providing a plurality of inter-connected Digital Access Units (DAUs), each configured to communicate with at least one of the plurality of DRUs via optical signals and each being coupled to at least one sector of a base station. The method also includes providing a plurality of sensors operable to detect activity at each of the plurality of DRUs and turning off a DRU downlink signal at one of the plurality of DRUs in response to an output from one of the plurality of sensors. The method further includes turning on a DRU downlink signal at another of the plurality of DRUs in response to an output from another of the plurality of sensors.

Embodiments of the present invention relate to a dynamic configuration of the DAS network's digital remote units (DRUs) parameters, such that the DRU's parameters can be modified, despite a fixed physical architecture. An example of a digital remote units (DRU) is a configurable radio with integrated routing capability located at a remote location from the base station (BTS) or baseband units (BBU). An example of a digital access unit (DAU) is a configurable radio with integrated routing capability co-located with the base stations or Baseband Units. This objective may be accomplished, for example, by using a plurality of digital remote units (DRUs) based on a Distributed Antenna System (DAS). Each DAS may receive resources (e.g., RF carriers, Long Term Evolution Resource Blocks, Code Division Multiple Access codes or Time Division Multiple Access time slots) from a central base station including a plurality of sectors and distribute the resources to a plurality of digital remote units (DRUs). Each DRU can serve as an antenna, receiving and transmitting signals, and thereby providing network coverage to a local geographic area surrounding the physical DRU. The DAS may be physically coupled to the base station and to the plurality of DRUs, e.g., through an optical fiber link. Thus, resources provided by one base station may be distributed to a plurality of DRUs, thereby providing coverage over a larger geographical area.

A DAS may be coupled (e.g., through another optical fiber link) to one or more other BTSs. Therefore, the DAS may also: (1) allocate part of the resources associated with another base station (which may be referred to as a sector) to the DRUs physically coupled to the DAS; and/or (2) allocate resources from the sector physically coupled to the DAS to serve DRUs physically coupled to another DAS. This may allow a system to dynamically allocate resources from a plurality of sectors to a network of DRUs (e.g., responding to geographic and temporal patterns in device usage), thereby improving the efficiency of the system and meeting desired capacity and throughput objectives and/or wireless subscriber needs.

A DAS network performance can be optimized for environments that have intermittent activity, as example along a train track. Train activity at each DRU can be synchronized with the plurality of DRU parameters in order to improve performance and reduce operational expenses. Although some embodiments of the present invention are illustrated in the context of train applications, the present invention is not limited to this particular transportation system and other transportation systems, including highways, roads, rivers, and the like are included within the scope of the present invention. Therefore, although trains are one example of a system with which embodiments of the present invention can be utilized, other vehicles including cars, trucks, boats, planes, and the like can benefit from embodiments of the present invention. One of ordinary skill in the art would recognize many variations, modifications, and alternatives.

According to an embodiment of the present invention, a system for optimizing performance in a Distributed Antenna System is provided. The system includes a plurality of Digital Remote Units (DRUs) configured to send and receive wireless radio signals and a plurality of interconnected Digital Access Units (DAUs), each configured to communicate with at least one of the plurality of DRUs via optical signals, and each being coupled to at least one sector. The system also includes a plurality of detectors to measure uplink power at each of the plurality of DRUs and an algorithm operable to turn off or on DRU uplink signals from one or more of the plurality of DRUs based on the uplink power detected by the plurality of detectors.

Each of the plurality of detectors can be implemented digitally using signal processing or as a discrete analog device. Each of the plurality of DAUs can be configured to communicate with the at least one of the DRUs by sending and receiving signals over at least one of an optical fiber, an Ethernet cable, microwave line of sight link, wireless link, or satellite link. The DRUs can be connected in a loop to a plurality of DAUs.

According to another embodiment of the present invention, a system for optimizing performance in a Distributed Antenna System is provided. The system includes a plurality of Digital Remote Units (DRUs) configured to send and receive wireless radio signals and a plurality of interconnected Digital Access Units (DAUs), each configured to communicate with at least one of the DRUs via optical signals, and each being coupled to at least one sector. The system also includes a plurality of sensors operable to detect activity at each of the plurality of DRUs and an algorithm to turn off and on DRU downlink signals and DRU uplink signals associated with each of the plurality of DRUs based, at least in part, on outputs of the plurality of sensor.

In an embodiment, each of the plurality of DAUs is configured to communicate with the at least one of the DRUs by sending and receiving signals over at least one of an optical fiber, an Ethernet cable, microwave line of sight link, wireless link, or satellite link. Each of the DAUs can be co-located with the at least one sector. Each of the plurality of DAUs can be connected to a plurality of DRUs, for example, with at least some of the plurality of DRUs being connected in a daisy chain configuration or with the plurality of DRUs being connected to at least one of the plurality of DAUs in a star configuration.

According to a specific embodiment of the present invention, a non-transitory computer-readable storage medium comprising a plurality of computer-readable instructions tangibly embodied on the computer-readable storage medium, which, when executed by one or more data processors, provide routing of wireless network signals, is provided. The plurality of instructions include instructions that cause the data processor to decode a digital signal and instructions that cause the data processor to identify a Digital Remote Unit (DRU) based on the decoded signal. The plurality of instructions also include instructions that cause the data processor to convert the digital signal into a radio-frequency signal, instructions that cause the data processor to dynamically determine an assignment pairing the DRU with one or more Base Transceiver Station sectors, the assignment being at least partly determined by dynamic geographic discrepancies in network use, and instructions that cause the data processor to transmit the digital signal to the one or more assigned sectors.

Numerous benefits are achieved by way of the present invention over conventional techniques. For instance, embodiments of the present invention allow a network to effectively respond to a geographically changing mobile user base. For example, users concentrated in a train traverse the network of DRUs along the train track, some DRU resources may be allocated to serve this train only for time periods when the users actually are or are predicted to be at this location. Thus, a network operator need not either waste DRU resources to provide coverage in other sections of the track during these times, nor must it degrade system performance by adding noise from non-active DRUs. Rather, DRU resources may be flexibly managed and controlled, thereby improving a network's efficiency, usage, overall performance and economics. Further, due to this foreseeable efficiency, specialized applications and enhancements may be enabled, such as flexible simulcast, automatic traffic load-balancing, network and radio resource optimization, network calibration, autonomous/assisted commissioning, carrier pooling, automatic frequency selection, radio frequency carrier placement, traffic monitoring, traffic tagging, traffic shaping, traffic allocation, traffic management and the like. Embodiments may also be implemented to serve multiple operators, multiple standards, multi-mode radios (modulation-independent) and multiple frequency bands per operator to increase the efficiency and traffic capacity of the operators' wireless networks.

These and other embodiments of the invention along with many of its advantages and features are described in more detail in conjunction with the text below and attached figures.

DETAILED DESCRIPTION OF SPECIFIC EMBODIMENTS

Wireless and mobile network operators face the continuing challenge of building networks that effectively manage high data-traffic growth rates and fluctuating traffic distribution. To ensure customer satisfaction, network operators attempt to provide networks that are available and functional in most locations where their clients will expect to be able to use their devices. This is a difficult task, as it is hard to determine how to geographically allocate resources, given the unpredictable nature of where and how users will wish to use their devices.

Allocating network resources is complicated by users' mobility and unpredictability. For example, configuring a network to effectively allocate wireless network resources to users on a train may present challenges (e.g., with regard to available wireless capacity and data throughput) as the train travels along the track.

Network operators are tasked with establishing wireless (e.g., cellular mobile communication systems) coverage across one or more large geographic areas. As described in greater detail below, dividing a geographic area into a plurality of cells allows a network operator to reuse resources (e.g., spectrum) across geographically separated cells.

Figure 1:
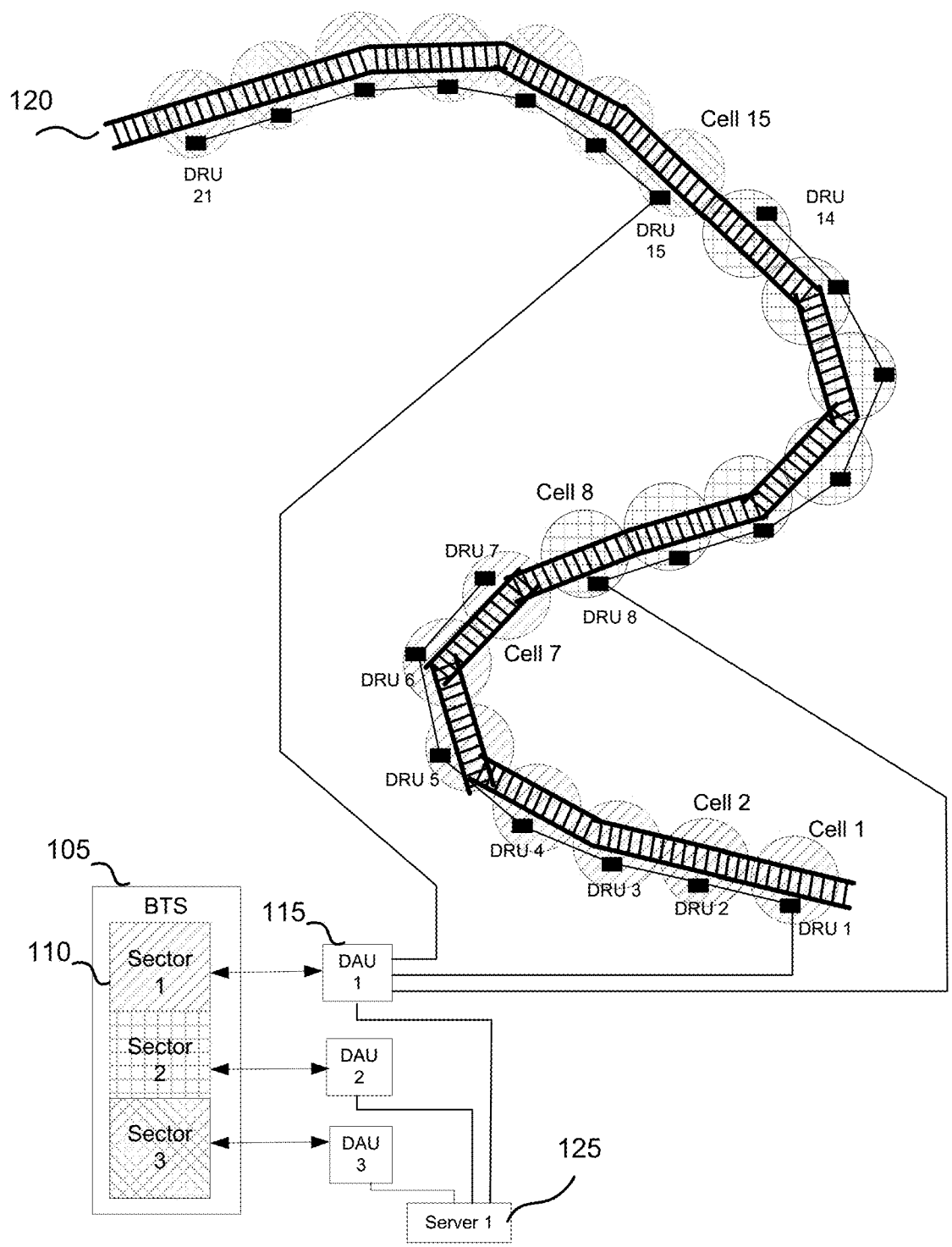
FIG. 1 is a high level schematic diagram illustrating a wireless network system providing coverage to a geographical area according to an embodiment of the present invention.

FIG. 1 is a diagram illustrating one wireless network system 100 that may provide coverage to a geographical area according to an embodiment of the present invention. The geographic area in FIG. 1 is along train track 120. Although embodiments have been described with reference to a train track example, it will be evident that various modifications and changes may be made to these embodiments without departing from the broader spirit and scope of the invention. System 100 may include a distributed antenna system (DAS), which may efficiently use base-station resources. One or more base stations 105 (also referred to as base transceiver stations (BTS)) may be located in a central location and/or at a base station hotel. One or more base stations 105 may include a plurality of independent outputs or radio resources, known as sectors 110. Each sector 110 may be responsible for providing wireless resources (e.g., RF carrier signals, Long Term Evolution Resource Blocks, Code Division Multiple Access codes, Time Division Multiple Access time slots, etc.). The resources may include one or more resources that allow a wireless user mobile device to effectively and wirelessly send and receive communications over a network. Thus, the resources may include one or more resources, such as those listed above, that allow a signal to be encoded or decoded in a manner to prevent the signal from interfering with or being interfered with by other wireless signals.

Each sector may be coupled to a digital access unit (DAU) 115, which may interface sector 110 (and thus base station 105) with digital remote units (DRUs) installed along train track 120. The coupling may represent a physical coupling. For example, DAU 115 may be connected to sector 110 and/or DRU 1 via a cable, a link, fiber, an RF cable, an optical fiber, an Ethernet cable, microwave link with or without line of sight, wireless link, satellite link, etc. In some instances, DAU 115 is connected to sector 110 via an RF cable. In some instances, DAU 115 is connected to one or more DRUs via an optical fiber or Ethernet cable. An associated sector 110 and DAU 115 may be located near each other or at a same location. DAU 115 may convert one or more signals, such as optical signals, RF signals, digital signals, etc. DAU 115 may include a multi-directional signal converter, such that, e.g., RF signals may be converted to optical signals and optical signals to RF signals, or to convert signals between a signal type associated with a sector and a signal type associated with a DRU. In one embodiment, DAU 115 converts a sector's downlink RF signals to optical signals, and/or converts a DRU's uplink optical signals to RF signals. DAU 115 may also or alternatively control routing of data and/or signals between sectors and DRUs, as explained in greater detail below. DAU 115 may generate, collect and/or store traffic statistics, such as a number of communications, calls, network-access and/or communication sessions, traffic volumes, quality of service data etc. between sector 110 and one or more DRUs.

Each DAU 115 may be coupled to a plurality of digital remote units (DRU). The plurality of DRUs may be coupled to the 115 through, e.g., a daisy-chain or loop (indirectly coupling a DAU with one or more DRUs) and/or star configuration (directly coupling a DAU to multiple DRUs). FIG. 1 shows an example of daisy-chain configurations, wherein a DAU couples to a first DRU directly (e.g., direct connection from DAU 1 to DRU 1), a second DRU indirectly (e.g., indirect connection from DAU 1 to DRU 2 through DRU 1), a third DRU indirectly (e.g., indirect connection from DAU 1 to DRU 3 through DRUs 1 and 2), etc. FIG. 1 also shows an example of star configurations, wherein a DAU couples to multiple DRUs directly (e.g., direct connections from DAU 1 to DRU 1 and DRU 15).

Each of the DRUs can provide coverage and capacity within a geographical area physically surrounding the DRU. DRUs may be strategically located to efficiently provide combined coverage across a larger geographical area. For example, DRUs 1 may be located e.g., along a train track, and/or coverage areas associated with adjacent DRUs may be barely overlapping. A network may include a plurality of independent cells that span a total coverage area.

As illustrated in FIG. 1, DRU 8 through DRU 14 are daisy chained to each other, with DRU 8 coupled, via an optical fiber, to DAU 1 (115). Because of the daisy chain architecture of this embodiment, as the train moves along the track from the cell associated with DRU 14 toward the cell associated with DRU 8, the uplink signals communicated through DRU 14 are transported down the daisy chain toward DRU 8. In some implementations, the noise associated with the uplink signals from each of the DRUs in the daisy chain is added as the uplink signals from the various DRUs are combined as the uplink signals move down the daisy chain toward DRU 8. As a result, for an uplink signal received at DRU 14, the noise from each of the intervening DRUs (DRU 13 through DRU 8) is combined to the original signal, reducing the signal to noise ratio as the uplink signal moves down the daisy chain.

As described herein, in order to improve the signal to noise ratio of the uplink signals, the DRUs not in active communication with the train are deemphasized in various embodiments. As an example, the amplitude/power of signals and noise associated with DRUs not in active communication with the train can be decreased when the level of communication with the train is low and increased for the DRUs in the vicinity of the train. Additional description related to decreasing the noise signal through control of the uplink signals is provided, for example, in relation to FIG. 4 below. In addition to control of the uplink signals, DRUs can be controlled to decrease the power associated with downlink signals broadcast by DRUs that are not in active communication with a train. Accordingly, power budgets and operational expenses can be reduced by control of the uplink and downlink traffic in areas where no train traffic is present. One of ordinary skill in the art would recognize many variations, modifications, and alternatives.

In conventional DAS networks, a first set of remote units in a first geographic area can be connected to a first BTS or a first sector of a BTS and a second set of remote units in a second geographic area can be connected to a second BTS or a second sector of the BTS. In an environment in which people are communicating while a train is moving, the calls for the users will be handed off from the first BTS to the second BTS as the train moves from the first geographic area to the second geographic area. If the volume of users is large, the heavy messaging traffic at the point of the hand offs can result in dropped calls, decreased data rates, and the like. Embodiments of the present invention provide methods and systems to ameliorate these problems associated with conventional systems.

Referring to FIG. 1, a benefit provided by the illustrated DAS network, with DRUs associated with a single sector of the BTS positioned along the track (e.g., DRU 1 through DRU 7 can be connected to Sector 1 (110)), is that as the train moves along the track from Cell 1 to Cell 7, no handoffs are needed, reducing the number of dropped calls and interruptions in data service. The digital DAS system illustrated in FIG. 1 provides DRUs positioned along the track in a generally linear manner in contrast with closed cell structures in which the cells are packed together in a hexagonal pattern covering a generally hexagonal/circular coverage area.

It should be noted that although a single train moving along the tracks is discussed in some embodiments, it will be appreciated that multiple trains can be traveling along the tracks concurrently and the discussions related to a single train can be extended to multiple trains as appropriate to the particular application.

Figure 2:
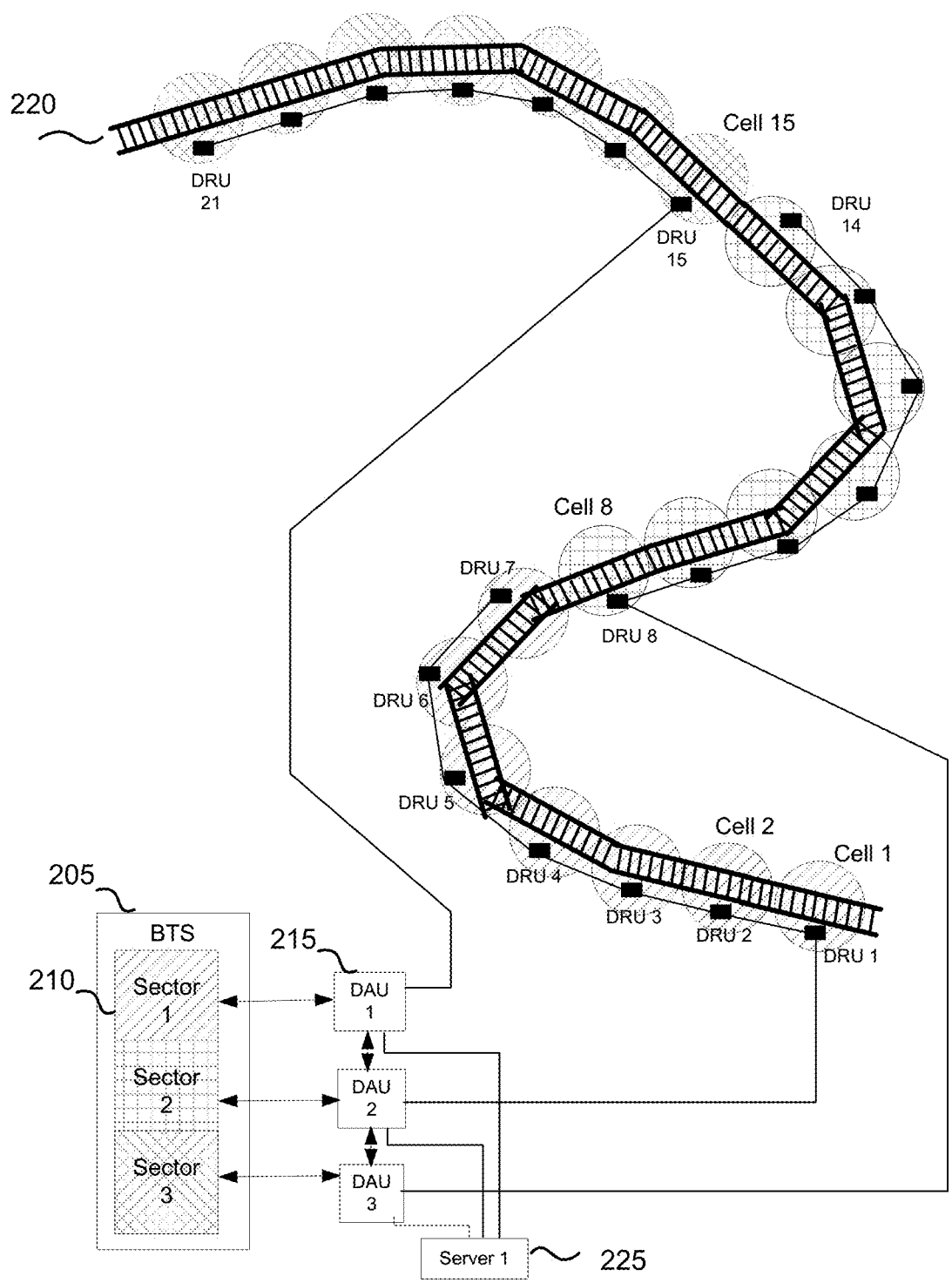
FIG. 2 is a high level schematic diagram illustrating a wireless network system comprising interconnected DAUs, the network providing coverage to a geographical area according to an embodiment of the present invention.

Each cell may be assigned to a sector 210. FIG. 2, for example, shows an embodiment in which Sector 1 provides resources to Cells 15 to 21, Sector 2 to Cells 1 to 7, and Sector 3 to Cells 8 to 14. An associated sector may provide each DRU with resources, such as RF carriers, resource blocks, etc. In one embodiment, each of a plurality of sectors 210 is associated with a set of "channels" or frequency ranges. The set of channels associated with each sector 210 may be different from a set of channels associated with other sectors 2 and 3 in base station 205. A network may be configured such that neighboring cells are associated with different channels (e.g., by being associated with different sectors 210), as shown in FIG. 2. This may allow channels to be reused across multiple cells without the risk of creating interference.

In the embodiment shown in FIG. 1, each sector 110 is connected to an associated subset of all of the DRUs in the network. Thus, for example, Sector 1's resources (e.g., assigned channels) cannot be used by a DRU located in Cell 8 without a physical alteration to the network hardware (e.g., by re-routing an optical fiber). This limitation is avoided by the embodiment shown in FIG. 2. Specifically, DRUs may be dynamically assigned to sectors 210 based on an interconnection between DAUs 215. Thus, for example, DRUs 8-14 in Cell 8 to 14 may initially all be assigned to Sector 3. (FIG. 2.) Subsequently, DRU 7 may be assigned to Sector 3 and DRU 14 may be assigned to Sector 1. In such instances, signals to DRU 7 may pass from Sector 2 through DAU 2 and through DAU 3. Similarly, signals may pass from DRU 14 through DAU 3 and DAU 1 to Sector 1. In this manner, a sector may be indirectly connected with a larger subset of DRUs in a network or with all DRUs in a network. Communications between DAUs may be partly controlled by one or more servers 225, as explained in greater detail below.

DAUs 210 may be physically and/or virtually connected. For example, in one embodiment, DAUs 210 are connected via a cable or fiber (e.g., an optical fiber, an Ethernet cable, microwave link with or without line of sight, wireless link, or satellite link). In one embodiment, a plurality of DAUs 210 are connected to a wireless network, which allows information to be transmitted from one DAU 210 to another DAU 210 and/or allows information to be transmitted from/to a plurality of DAUs 210.

Figure 3:
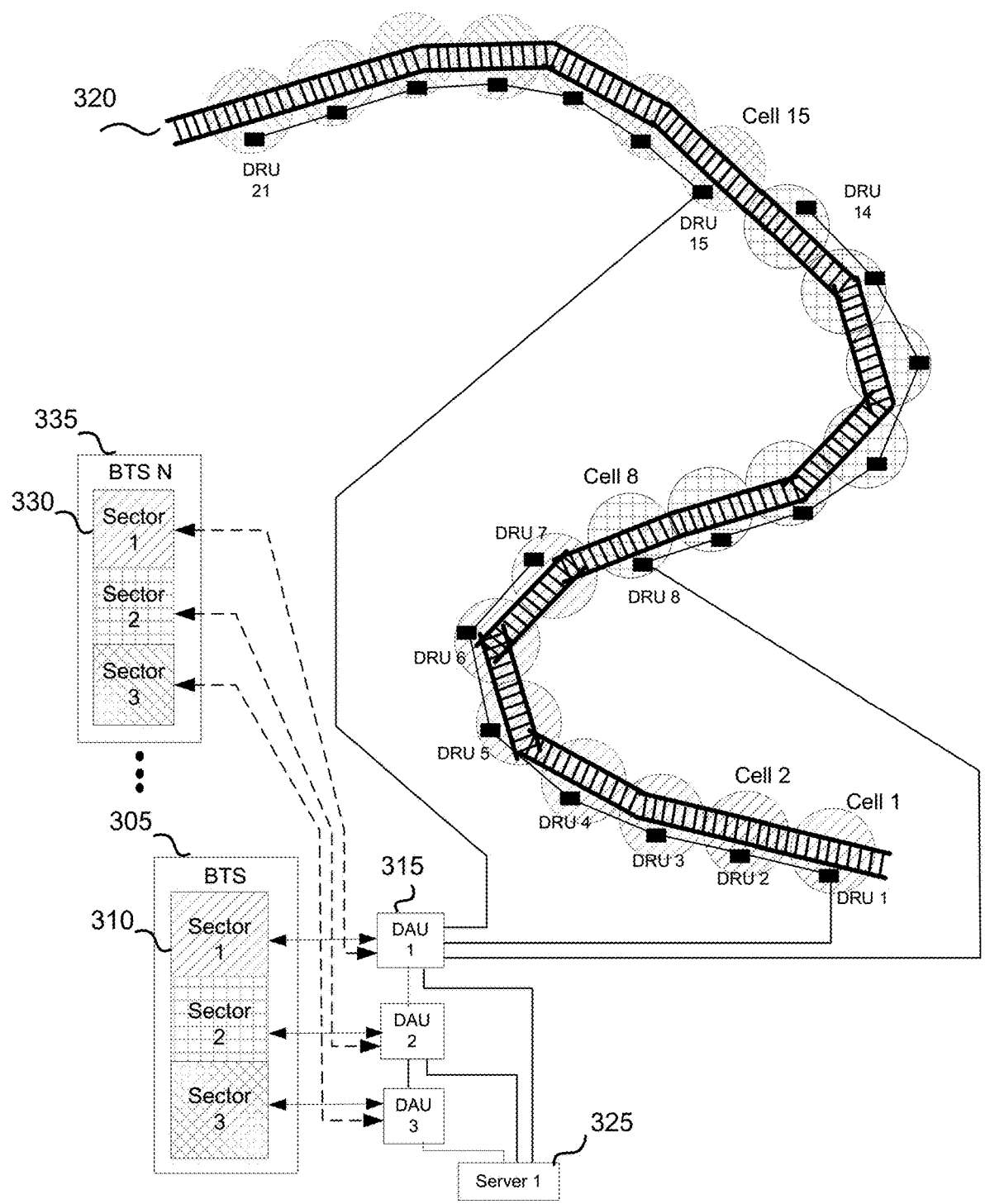
FIG. 3 is a high level schematic diagram illustrating a wireless network system comprising interconnected DAUs and multiple base station hotels, the network providing coverage to a geographical area according to an embodiment of the present invention.

As shown in FIG. 3, a multi-operator system or a system with multiple base stations of one operator or a combination of both may include multiple base stations (or multiple base station hotels) 305. A Neutral Host scenario is defined when multiple operators co-exist on the same infrastructure and the system is hosted by either one of the operators or a $3^{rd}$ party. Different base stations 305 may be associated with the same, overlapping, non-overlapping or different frequency bands. Base stations 305 may be interconnected, e.g., to serve a geographic area. The interconnection may include a direct connection extending between the base stations (e.g., a cable) or an indirect connection (e.g., each base station connecting to a DAU, the DAUs being directly connected to each other). The greater number of base stations may increase the ability to add capacity for a given cell. Base stations 305 may represent independent wireless network operators and/or multiple standards (WCDMA, LTE, etc.), and/or they may represent provision of additional RF carriers as well as additional baseband capacity. In some embodiments, base station signals are combined before they are connected to a DAU, as may be the case for a Neutral Host application. In one instance, as shown in FIG. 3, sectors from BTS 1 are directly coupled to the same DAUs and/or DRUs that are directly coupled to sectors to BTS N. In some other instances, one or more sectors from different BTS may be directly coupled to DAUs not shared by sectors of one or more other DAUs.

Figure 4:
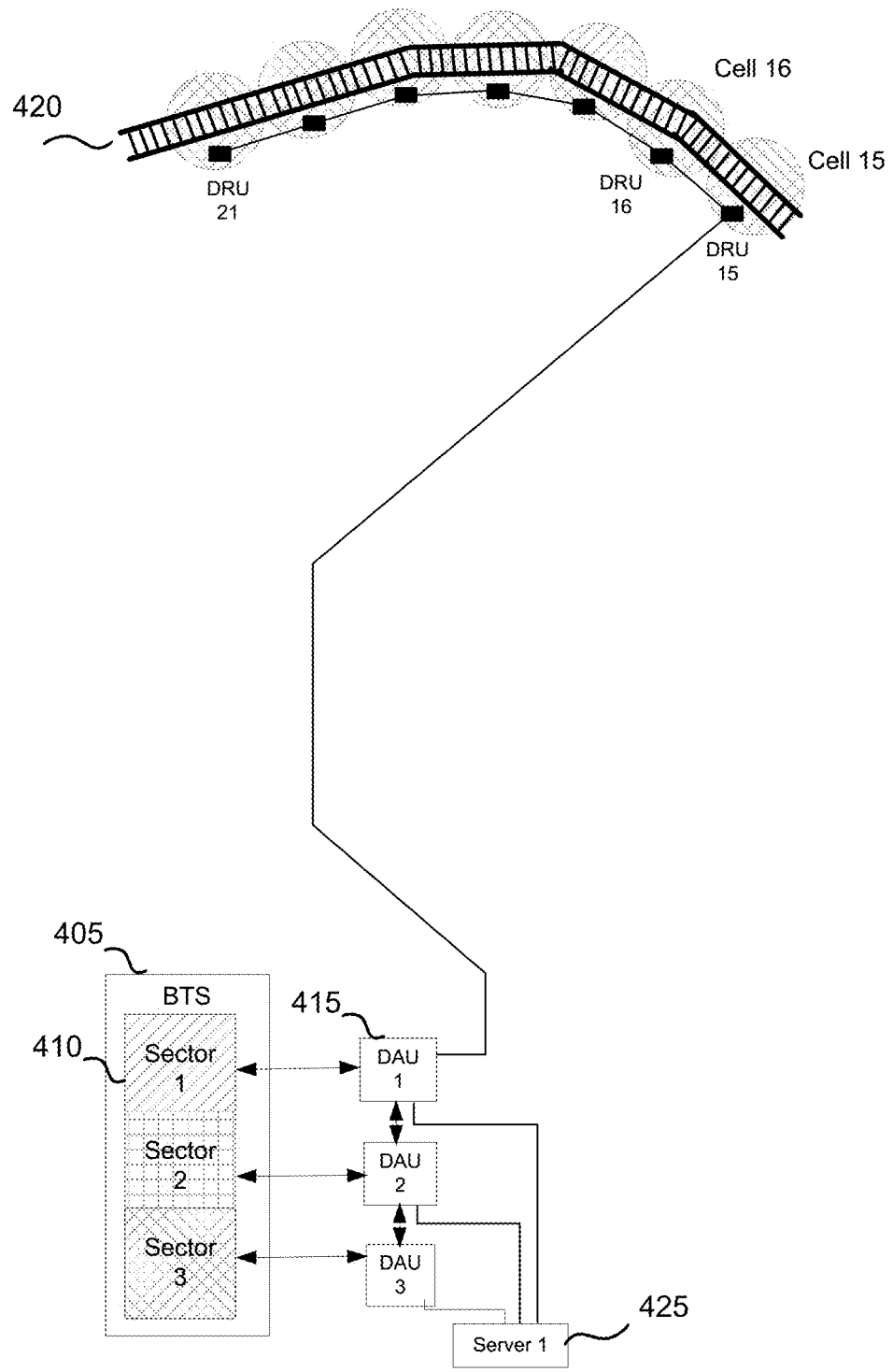
FIG. 4 is a high level schematic diagram illustrating a distributed antenna system (DAS) that covers a portion of a train track according to an embodiment of the present invention.

FIG. 4 is a diagram illustrating a distributed antenna system (DAS) that covers a portion of a train track according to an embodiment of the present invention. As illustrated in FIG. 4, this high level schematic diagram illustrates a wireless network system comprising daisy chained DRUs with the Up-Link signals from each DRU being scaled and summed, with the network providing coverage to a geographic area. In this example, DRU 15 to DRU 21 covering cells 15 to 21 are assigned to Sector 1. Based on network hardware and architecture, signals from DRUs 15-21 are routed to DAU 1. DAU 1 combines the uplink signals from DRU 15-21 or receives signals that are combined, in turn, at each of the DRUs. In this embodiment, DAU 1 associates gain coefficients {α, β, . . . δ} for each of the respective DRUs {15, 16 . . . 21} assigned to DAU 1. The gain coefficients are used to scale the uplink signals. The equation below demonstrates how the uplink signals from DRUs k through N (e.g., 15-21) are combined to provide scaled uplink signals that are transmitted to DAU 1.

$$\sum_{DRU_k}^{N} DRU = \alpha \cdot DRU_k + \beta \cdot DRU_{k+1} + \ldots \delta \cdot DRU_N$$

The gain coefficients are adjustable from zero to one, providing for individual control over the signals uplinked using each DRU. In some embodiments, the sum of the scaled uplink signals from the DRUs can be referred to as a scaled uplink signal, which is received at the DAU. In addition to uplink control, downlink control is provided in some embodiments. As an example, as a train moves from Cell 15 towards Cell 21, initially Cell 15 is at full power (i.e., $\alpha=1$) and Cell 21 is off ($\delta=0$). Cells between Cell 15 and Cell 21 are at levels between zero and one. As the train moves towards Cell 21, the gain coefficients are adjusted by decreasing $\alpha$ and increasing $\delta$ to match the gain associated with the DRUs to the position of the moving train.

A train contains a high density of mobile users. As this group of mobile users travel along the track different DRUs are active. However, the Up Link signal presented to BTS 405 comprises the addition of all the DRUs connected to DAU 1. Even if a DRU experiences no activity it will contribute to the overall noise floor when all gain coefficients are set to unity. The DAS system in FIG. 4 can alter the gain coefficients thereby turning the Uplink channels from the DRUs up or down (or on or off) depending on the train activity at their respective sites. DRUs with no activity can be switched off in order to reduce the noise contribution associated with those inactive DRUs. As discussed above, in addition to control of the uplink channels, control of downlink channels can be implemented to reduce the power consumption of DRUs that are not in active communication with the train and the resulting operating expenses.

Figure 5:
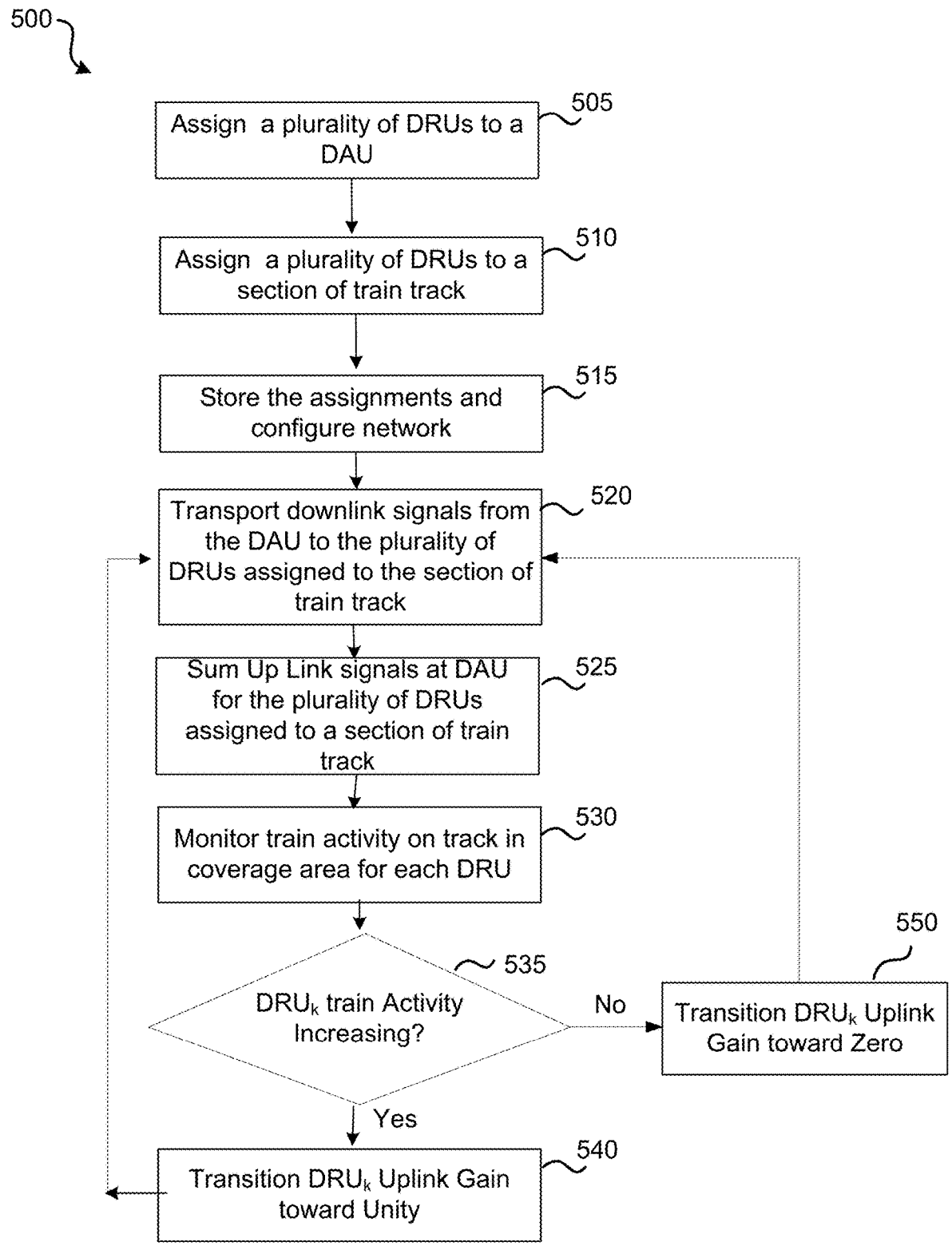
FIG. 5 is a high level flowchart illustrating a method of detecting train activity and controlling DRU Up-Link signals according to an embodiment of the present invention.

FIG. 5 is a simplified flowchart illustrating a method of controlling DRU uplink gain according to an embodiment of the present invention. In this embodiment, a performance optimization algorithm for the DAS network alongside of the train track is provided. In functional block 505, the DRUs are assigned to various DAUs. As an example, DRUs connected to a DAU using an optical fiber can be assigned to the DAU to which they are connected. The DAUs are connected to sectors in the Base Transceiver Stations (BTSs). Functional block 510 assigns a subset of the DRUs to a section of the train track. This assignment relates the geographic location of the cells associated with the DRUs to their locations along the track. The network of DRUs, DAUs and BTSs are configured and the assignments are stored in memory (515).

The downlink signals from the BTS sectors are routed to the assigned DAUs and subsequently DRUs (520). The DRU uplink signals received at the DRUs are routed to the assigned DAU for the subset of DRUs assigned to the DAU. The uplink signals from the DRUs are scaled by a gain coefficient and then combined and fed to the sector for that specific BTS, in functional block 525. As described above, inactive DRUs can contribute noise to the uplink signals thereby degrading the overall system performance. Functional block 530 monitors the train activity at each respective DRU, referred to as $DRU_k$. Although embodiments have been described with reference to a train activity monitor example, it will be evident that various modifications and changes may be made to these embodiments without departing from the broader spirit and scope of the invention.

The train activity monitor can be a sensor (e.g., an external monitor) that detects motion of the train along the track or it could be a measurement of the cellular signal strength or the cellular data activity in a geographic area. A monitor can be implemented using signal processing inside the DRU, for example, based on the uplink signal strength. An external monitor could be an optical detector, vibration detector, radar detector, etc. In some embodiments, train schedules are utilized to provide inputs to the system, effectively providing monitoring inputs. In other embodiments, communication from the train (e.g., a broadcasted GPS location) can be utilized as a monitor input, in place of or in conjunction with other monitors. One of ordinary skill in the art would recognize many variations, modifications, and alternatives.

The train activity monitor will become active when a train traverses a DRU cell that provides coverage to a geographical area. This will be an indication that the DRU will momentarily experience a large number of mobile users as the train enters the geographic area associated with the DRU. In some embodiments, a threshold will be set for the train activity monitor. Although embodiments have been described with reference to a threshold trigger example, it will be evident that various modifications and changes may be made to these embodiments without departing from the broader spirit and scope of the invention.

If the train activity monitor indicates that the activity is increasing (or goes above a threshold setting), then the gain coefficient corresponding to that DRU will be transitioned toward unity (540). This will effectively connect the DRU with the given BTS sector, via the DAU. If the train activity monitor indicates that the activity is decreasing (or falls below the threshold) then the DRU uplink gain coefficient corresponding to that DRU will be transitioned toward zero (550). This will reduce the noise contribution from those DRUs that have no active mobile users passing through their cells.

A closed loop is demonstrated in the flowchart 500, whereby the train activity monitors are continually or regularly analyzed or compared to the threshold and the gain coefficients are adjusted accordingly. In some embodiments, the closed loop returns to block 530 after decision point 535 and the gain adjustments in blocks 540 or 550.

The train activity monitor/sensors are thus configured to provide data that is utilized by the system to control the operation of the DRUs as described herein. As illustrated by the operation discussed in relation to FIG. 5, some embodiments increase/decrease the gain coefficients in small steps or continuously to vary the gain between values of zero and one. As an example, as a train approaches a DRU, the gain can be turned up gradually, peaking at one when the train is adjacent to the DRU and then gradually turning the gain down as the train leaves the area of the DRU. Thus, some embodiments utilize a scale that increases/decreases the gain in response to increases/decreases in train activity. In other embodiments, the train activity is compared to a threshold. If the threshold is exceeded, the DRU uplink gain is set to unity. If the activity does not exceed the threshold, the DRU uplink gain is set to zero. One of ordinary skill in the art would recognize many variations, modifications, and alternatives.

Figure 6:
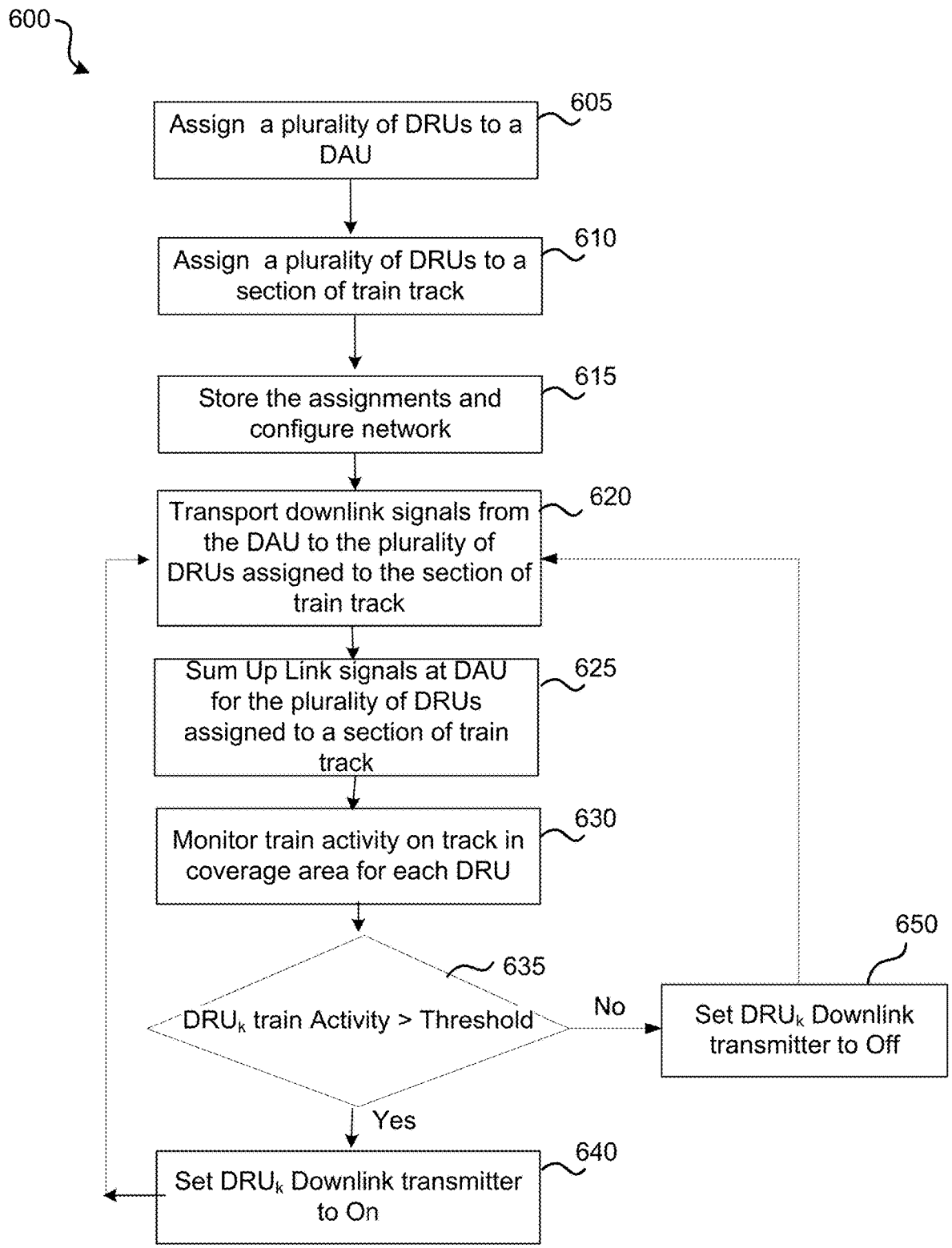
FIG. 6 is a high level flowchart illustrating a method of detecting train activity and activating and de-activating DRU downlink transmitters, according to an embodiment of the present invention.

FIG. 6 is a flowchart of one embodiment of the performance optimization algorithm for the DAS network alongside of the train track. Flowchart 600 has a similar functionality to flowchart 500, with the exception that the DRU transmitters and or receivers will be controlled (e.g., turned off and on) depending on the train activity monitor. The primary objective of turning off the DRU transmitters and or receivers is to reduce the operational expenses and reduce the interference to Macro BTSs in neighboring cells. In some embodiments, the DRU downlink path is not turned off, but decreased in power as a function of the train activity that is monitored. In these embodiments, the train activity is monitored (630) on a periodic or other temporal basis. If the train activity is increasing, then the power associated with the downlink transmitter is increased toward a maximum power (similar to block 640). If the train activity is decreasing, then the power associated with the downlink transmitter is decreased toward zero (similar to block 650). Thus, blocks 540 and 550 illustrated in FIG. 5 can be substituted for blocks 640 and 650 in FIG. 6. Likewise, blocks 640 and 650 illustrated in FIG. 6 can be substituted for blocks 540 and 550 in FIG. 5 as discussed above.

Figure 7:
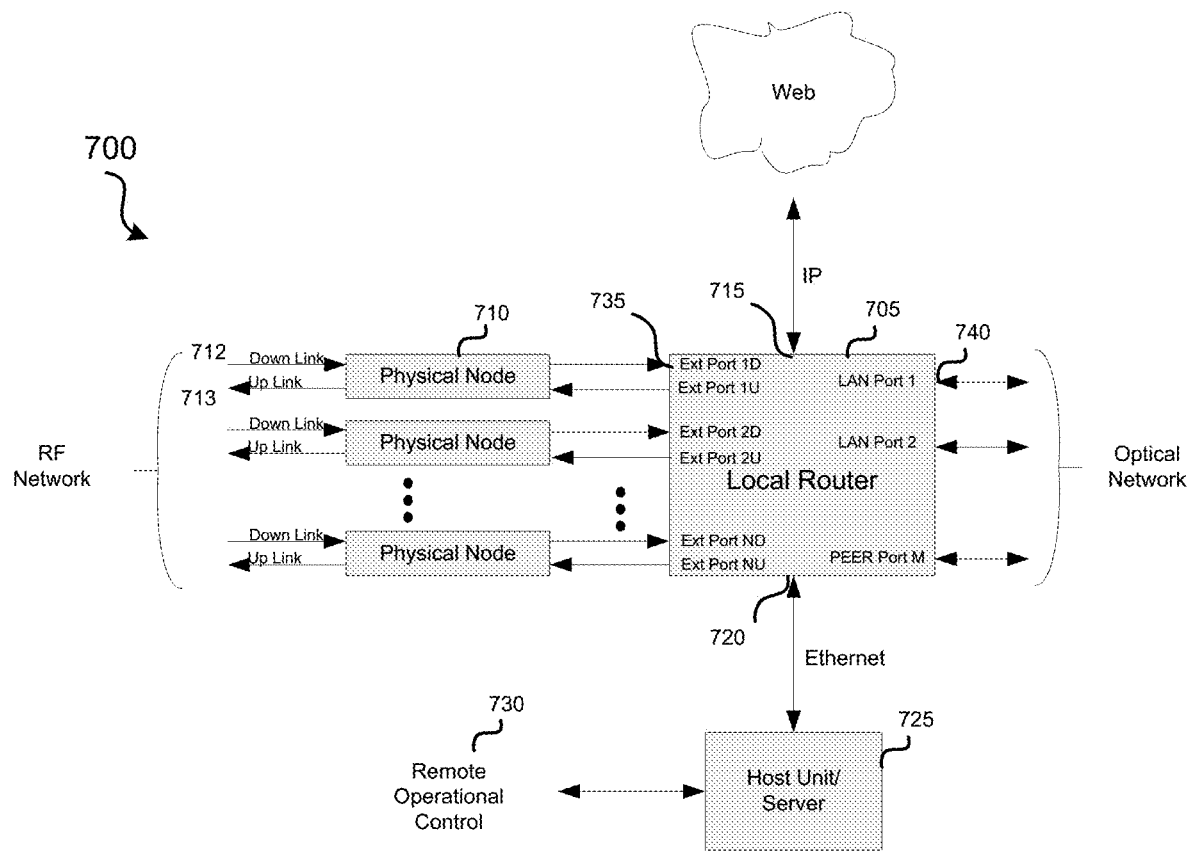
FIG. 7 is a high level schematic diagram illustrating a DAU according to an embodiment of the present invention.

FIG. 7 illustrates components of a DAU 700 according to an embodiment of the invention. DAU 700 may include a router (i.e., Local Router 705). DAU 700 may include one or more ports 715 and 720. Ports 715 and 720 may, e.g., enable DAU to connect to the Internet and/or a Host Unit or a server 725. Server 725 may at least partly configure the DAU and/or control the routing of the signals between various Local Router ports. Server 725 may be, e.g., at least partly controlled by a remote operational control 730 (e.g., to set re-assignment conditions, identify assignments, store assignments, input network configurations, receive/collect/analyze network usage, etc.).

DAU 700 may include one or more physical nodes 710, which may be coupled to Local Router 705 by one or more first-end ports 735. Each physical node 710 may include one, two, or more ports, such as first-end ports, each of which may allow signals (e.g., RF signals and/or signals from/to a sector) to be received by or transmitted from DAU 700. In some embodiments, a plurality of physical nodes 710 each includes a Downlink port 712 and an Uplink port 713. In some embodiments, a physical node 710 may also include an additional Uplink port, e.g., to handle a diversity connection. Output ports (e.g., Downlink port 712 and Uplink port 713) may be coupled to one or more ports (e.g., RF pots) of a base station. Thus, DAU 700 may be physically coupled to a base station.

Local Router 705 may include one or more second-end ports 740, which may couple DAU 700 to one or more DRUs or DAUs e.g., via an optical fiber, Ethernet cable, line of sight or non-line of sight microwave connection, etc.). The second-end ports 740 may include LAN or PEER ports. Second-end ports 740 may be configured to send and/or receive signals, such as digital and/or optical signals. In one embodiment, at least one second-end port 740 couples DAU 700 to another DAU, and at least one second-end port 740 couples DAU 700 to a DRU. The local router also encodes the signals for transportation over the optical link as well as decodes the optical signals from the optical link. The Physical Nodes perform the function of translating the RF signals to baseband or translating the baseband signals to RF. The DAU can monitor the traffic on the various ports and either route this information to a server or store this information locally.

Figure 8:
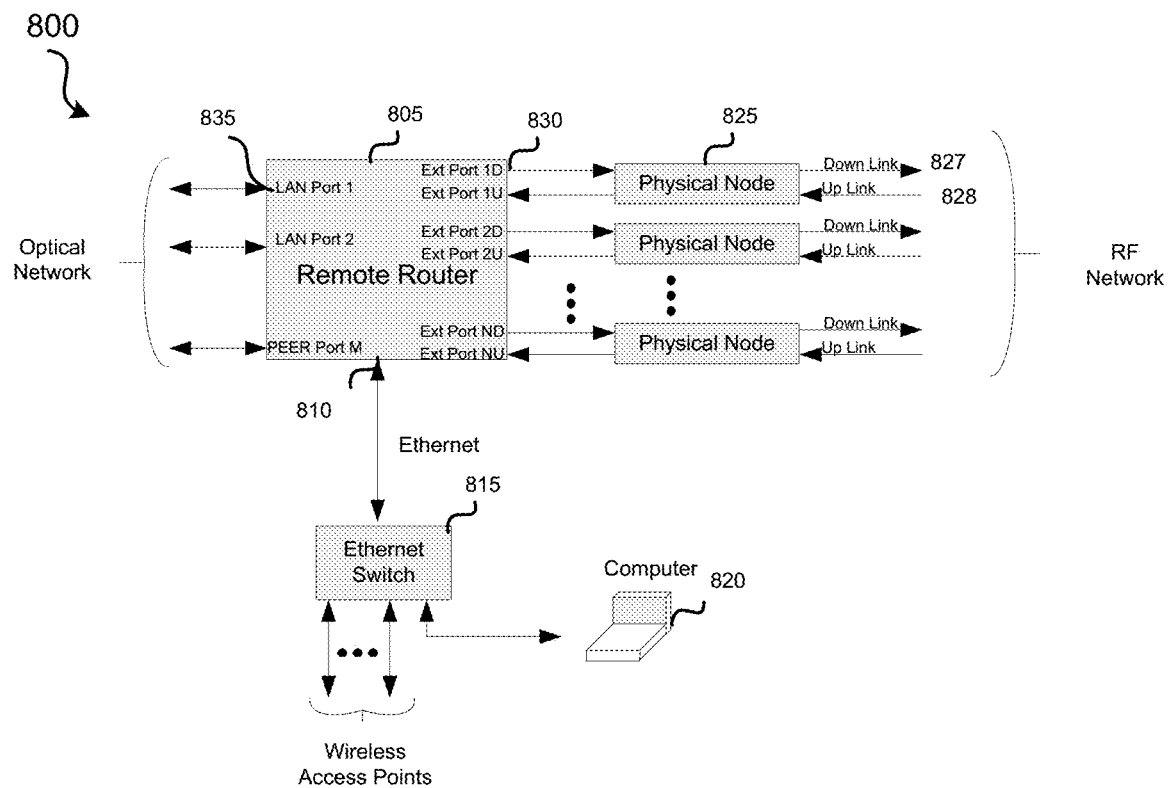
FIG. 8 is a high level schematic diagram illustrating a DRU according to an embodiment of the present invention.

FIG. 8 illustrates components of a DRU 800 according to an embodiment of the invention. DRU 800 may include a router (i.e., Remote Router 805). DRU may include a network port 810, which may allow DRU 800 to couple (via an Ethernet Switch 815) to a (e.g., wireless) network. Through the network, DRU 800 may then be able to connect to a computer 820. Thus, a remote connection may be established with DRU 800.

Remote Router 805 may be configured by a server, such as server 130, server 725, a server connected to one or more DAUs, and/or any other server. Network port 810 may be used as a Wireless access point for connection to the Internet. The Internet connection may, e.g., established at the DAU and Internet traffic may be part of the data transport between the DRUs Physical Nodes and the DAU Physical Nodes.

DRU 800 may include one or more physical nodes 825. Each physical node 825 may include one, two, or more ports, such as first-end ports 830, each of which may allow for signals (e.g., RF signals and/or signals from mobile devices) to be received by or transmitted from DRU 800. In some embodiments, a plurality of physical nodes 825 each include one or more ports configured to send/receive signals (e.g., RF signals) from/to DRU 800. The ports may include, e.g., a Downlink port 827 and an Uplink port 828. In some embodiments, an additional Uplink port exists for handling a diversity connection. Physical node ports (e.g., Downlink output port 827 and Uplink output port 828) may be connected to one or more antennas (e.g., RF antennas), such that signals may be received from and/or transmitted to, e.g., mobile wireless devices.

Remote Router 805 may include one or more second-end ports 835, which may couple DRU 800 to one or more DAUs or DRUs. Second-end ports 835 may include LAN or PEER ports, which may (e.g., physically) couple DRU 800 to one or more DAUs or DRUs via an optical fiber, Ethernet cable, line of sight or non-line of sight microwave connection.

It should be appreciated that the specific steps illustrated in FIGS. 5 and 6 provide particular methods according to an embodiment of the present invention. Other sequences of steps may also be performed according to alternative embodiments. For example, alternative embodiments of the present invention may perform the steps outlined above in a different order. Moreover, the individual steps illustrated in FIGS. 5 and 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Methods shown in FIGS. 5 and 6 or elsewhere described may be performed by a variety of devices or components. For example, some processes may be performed solely or partly by one or more DAUs. Some processes may be performed solely or partly by a remote computer, e.g., coupled to one or more DAUs. Some processes may be performed by one or more DRUs. In some embodiments, shown or described process may be performed by multiple devices or components (e.g., by multiple DAUs, by one DAU and a remote server, by one or more DRUs and a DAU, etc.).

Above-described embodiments may be implemented with, e.g. distributed base stations, distributed antenna systems, distributed repeaters, remote radio units, mobile equipment and wireless terminals, portable wireless devices, and/or other wireless communication systems such as microwave and satellite communications. Many variations are possible. For example, embodiments including a single base station may be applied in systems including multiple, interconnected base stations. Embodiments may be modified to replace daisy-chain configurations with star configurations or the converse or extend daisy-chain configuration into loops. Embodiments showing a single server (e.g., connected to a plurality of DAUs) may be modified to include a plurality of servers (e.g., each connected to a different DAU or connected to all DAUs).

Figure 9:
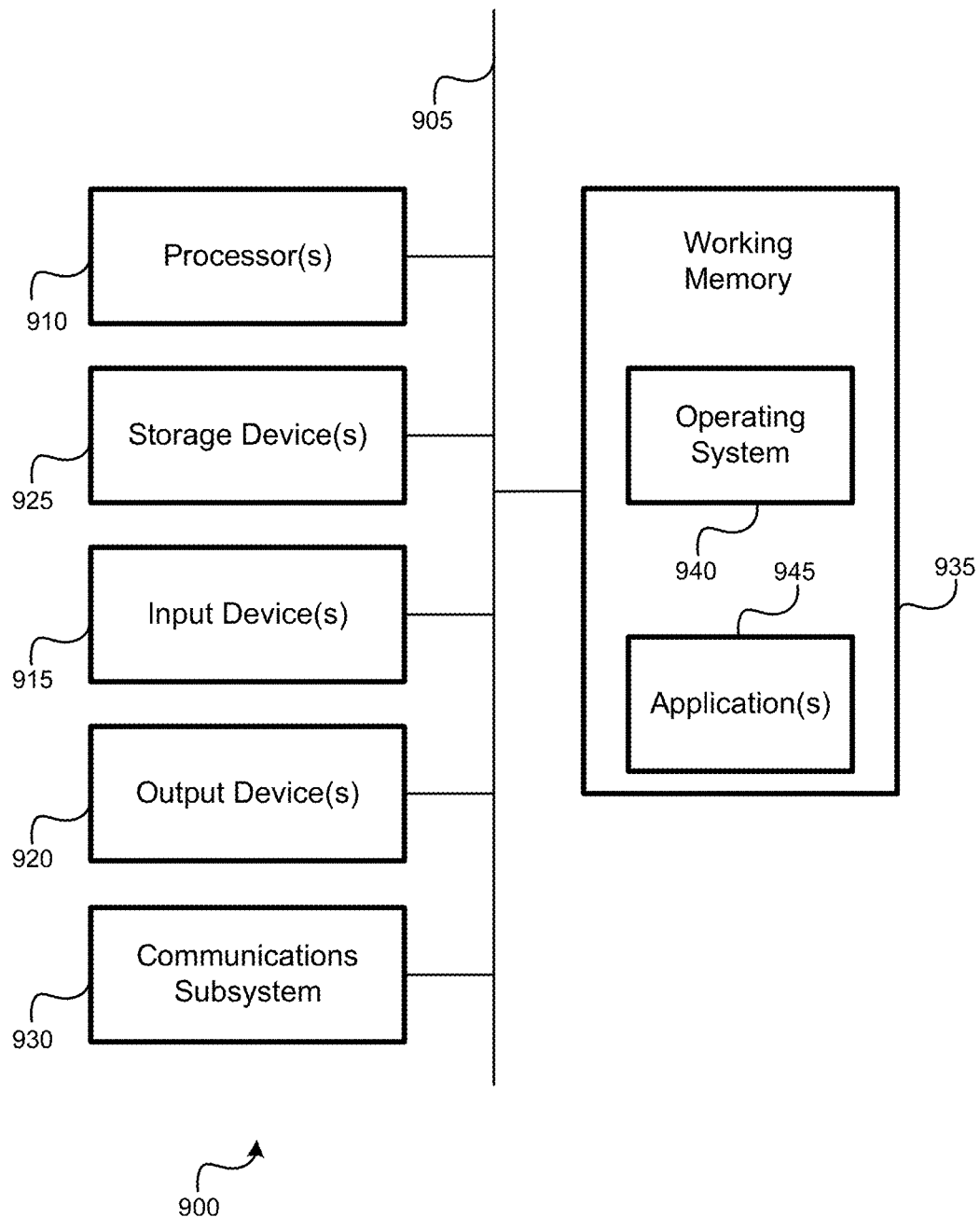
FIG. 9 is a high level schematic diagram illustrating a computer system according to an embodiment of the present invention.

FIG. 9 is a high level schematic diagram illustrating a computer system 900 including instructions to perform any one or more of the methodologies described herein. One or more of the above-described components (e.g., DAU 115, DRU 1, server 130, server 725, computer 920, etc.) may include part or all of computer system 900. System 900 may also perform all or part of one or more methods described herein. FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an optical communication device, an infrared communication device, a wireless communication device and/or chipset (such as a Bluetooth device, a WiFi (802.11) device, a WiMax (802.16) device, a zigbee (802.15) device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 900, various computer-readable media might be involved in providing instructions/code to processor(s) 910 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, etc.

Cloud based computing is another example of an embodiment of the computer system 900.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although embodiments of the present invention have been discussed in relation to digital DAS networks, the present invention is not limited to digital implementations and embodiments of the present invention are applicable to analog DAS networks. In these analog implementations, analog remotes are utilized that receive wireless signals in the uplink path and transmit analog signals to an analog host unit. In some analog embodiments, the analog remotes can be connected to the analog host unit using a star configuration in which the host unit is individually connected to each analog remote using a suitable connection, for example an analog over fiber connection. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   providing a plurality of Digital Remote Units (DRUs), each configured to send and receive wireless radio signals;
   providing a plurality of Digital Access Units (DAUs), each configured to communicate with at least one of the plurality of DRUs and each being coupled to at least one base station;
   providing a plurality of motion sensors operable to detect train activity at respective ones of the plurality of DRUs;
   detecting a decrease in train activity at least one of the plurality of motion sensors; and
   in response to the detected decrease in train activity, transitioning an uplink gain toward zero for the one of the plurality of DRUs.

2. The method of claim 1, wherein each of the plurality of DAUs is configured to communicate with the at least one of the plurality of DRUs by sending and receiving signals over at least one of an optical fiber, an Ethernet cable, microwave line of sight link, wireless link, or satellite link.

3. The method of claim 1, wherein the plurality of DAUs comprises a first DAU connected to a first sector of the base station and a second DAU connected to a second sector of the base station.

4. The method of claim 1, wherein each of the plurality of motion sensors is provided by a signal processing processor in each of the plurality of DRUs.

5. The method of claim 1, wherein the plurality of DRUs are connected in a daisy chain configuration.

6. The method of claim 1, wherein the plurality of DRUs comprises a first set of two or more DRUs and a second set of two or more DRUs, the first set and the second set being coupled to at least one of the plurality of DAUs in a star configuration.

7. A Distributed Antenna System (DAS) comprising:
   a plurality of Digital Remote Units (DRUs), each configured to send and receive wireless radio signals;
   a plurality of Digital Access Units (DAUs), each configured to communicate with at least one of the plurality of DRUs and each being coupled to at least one base station;
   a plurality of motion sensors operable to detect train activity at respective ones of the plurality of DRUs, at least one of the plurality of motion sensors operable to detect a decrease in train activity at least one of the plurality of DRUs and, in response to the detected decrease in train activity, at least one of the plurality of DRUs configured to transition an uplink gain toward zero.

8. The system of claim 7, wherein each of the plurality of DAUs is configured to communicate with the at least one of the plurality of DRUs by sending and receiving signals over at least one of an optical fiber, an Ethernet cable, microwave line of sight link, wireless link, or satellite link.

9. The system of claim 7, wherein the plurality of DAUs comprises a first DAU connected to a first sector of the base station and a second DAU connected to a second sector of the base station.

10. The system of claim 7, wherein each of the plurality of motion sensors is provided by a signal processing processor in each of the plurality of DRUs.

11. The system of claim 7, wherein the plurality of DRUs are connected in a daisy chain configuration.

12. The system of claim 7, wherein the plurality of DRUs comprises a first set of two or more DRUs and a second set of two or more DRUs, the first set and the second set being coupled to at least one of the plurality of DAUs in a star configuration.

13. A system comprising:
   a plurality of Digital Remote Units (DRUs), each configured to receive wireless radio uplink signals and transmit wireless radio downlink signals, wherein a first DRU of the plurality of DRUs is associated with a first geographic area and a second DRU of the plurality of DRUs is associated with a second geographic area;
   a plurality of inter-connected Digital Access Units (DAUs), each configured to communicate with at least one of the plurality of DRUs via optical signals and each being coupled to at least one base station;
   a plurality of stationary detectors, each configured to measure uplink power at one of the plurality of DRUs and motion of a train; and
   a train activity monitor, co-located at each DRU of the plurality of DRUs, communicatively coupled to the plurality of stationary detectors and configured to:
   monitor a level of train activity in a geographic coverage area for each of the plurality of DRUs using the measured uplink power and the measured motion of the train; and
   vary one or more wireless radio uplink signals in response to the measured uplink power and the level of train activity in the geographic coverage area for each of the plurality of DRUs by:
      transitioning an uplink gain toward zero for the first DRU in response to determining a decrease in monitored train activity in the first geographic area; and
      increasing power associated with the second DRU in response to determining an increase in monitored train activity in the second geographic area.

14. The system of claim 13, wherein each of the plurality of stationary detectors are implemented digitally using signal processing.

15. The system of claim 13, wherein each of the plurality of stationary detectors comprises a discrete analog device.

16. The system of claim 13, wherein each of the plurality of DAUs is configured to communicate with the at least one of the plurality of DRUs by sending and receiving signals over at least one of an optical fiber, an Ethernet cable, microwave line of sight link, wireless link, or satellite link.

17. The system of claim 13, wherein the plurality of DRUs are connected to each other in a daisy chain configuration and are each positioned in a substantially linear manner along a train track.

18. The system of claim 13, wherein one of the plurality of DAUs includes the train activity monitor.

19. The system of claim 13, wherein the train activity monitor is provided in a server coupled to the plurality of inter-connected DAUB.

20. The method of claim 1, wherein the transitioning of the uplink gain toward zero reduces a noise contribution from DRUs that have no active mobile users passing through their cells.

* * * * *

UNITED STATES PATENT AND TRADEMARK OFFICE
CERTIFICATE OF CORRECTION

| | |
|---|---|
| PATENT NO. | : 11,057,109 B2 |
| APPLICATION NO. | : 16/360980 |
| DATED | : July 6, 2021 |
| INVENTOR(S) | : Shawn Patrick Stapleton, Sasa Trajkovic and Wolfgang Weber |

Page 1 of 1

It is certified that error appears in the above-identified patent and that said Letters Patent is hereby corrected as shown below:

On the Title Page

(71) Applicant:
Please delete "Dali Systems Co. Ltd., Grand Cayman (KY)" and insert --Dali Systems Co. Ltd., George Town, Grand Cayman (KY)--;

In the Claims

Column 17, Claim 19, Line 11, please delete "DAUB" and insert --DAUs--.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*